US005949408A

United States Patent [19]
Kang et al.

[11] Patent Number: 5,949,408
[45] Date of Patent: Sep. 7, 1999

[54] DUAL ORIENTATION DISPLAY HANDHELD COMPUTER DEVICES

[75] Inventors: Beng Hong Kang, Farrer Ct, Singapore; Chun Wun Yeung, Santa Clara, Calif.; Eswin Tedja; Jin-Meng Tan, both of Singapore, Singapore

[73] Assignee: Hewlett-Packard Company, Palo Alto, Calif.

[21] Appl. No.: 08/799,319

[22] Filed: Feb. 13, 1997

Related U.S. Application Data

[63] Continuation-in-part of application No. 08/535,411, Sep. 28, 1995, abandoned.
[51] Int. Cl.⁶ .............. G09G 3/36; G09G 5/34; G09G 5/00; G06F 1/16
[52] U.S. Cl. .......... 345/169; 345/100; 345/126; 345/179; 345/905; 361/680; 361/681; 364/708.1
[58] Field of Search ............... 345/905, 98, 173, 345/100, 126; 361/681, 683; 364/707, 709.09, 708.1, 708; 395/653, 340; 455/90; 382/297

[56] References Cited

U.S. PATENT DOCUMENTS

| 362,662 | 9/1887 | Baudot . | |
|---|---|---|---|
| 4,497,036 | 1/1985 | Dunn | 364/708 |
| 4,697,050 | 9/1987 | Farel et al. | 178/18 |
| 5,133,076 | 7/1992 | Hawkins et al. | 364/709.09 |
| 5,231,578 | 7/1993 | Levin et al. | 364/419 |
| 5,345,543 | 9/1994 | Capps et al. | 395/137 |
| 5,367,626 | 11/1994 | Morioka et al. | 395/159 |
| 5,438,475 | 8/1995 | Bradley | 361/683 |
| 5,451,724 | 9/1995 | Nakazawa | 345/173 |
| 5,452,413 | 9/1995 | Blades | 395/159 |
| 5,452,414 | 9/1995 | Rosendahl et al. | 395/159 |
| 5,481,665 | 1/1996 | Okada et al. | 395/155 |
| 5,488,575 | 1/1996 | Danielson et al. | 364/707 |
| 5,489,924 | 2/1996 | Shima et al. | 345/173 |
| 5,506,749 | 4/1996 | Matsuda | 361/683 |
| 5,512,920 | 4/1996 | Gibson | 345/163 |
| 5,566,098 | 10/1996 | Lucente et al. | 364/708.1 |
| 5,583,542 | 12/1996 | Capps et al. | 345/173 |
| 5,594,619 | 1/1997 | Miyagawa et al. | 361/681 |
| 5,596,697 | 1/1997 | Foster et al. | 395/340 |
| 5,644,469 | 7/1997 | Shioya et al. | 361/681 |
| 5,661,632 | 8/1997 | Register | 361/683 |
| 5,663,745 | 9/1997 | Ishikawa et al. | 345/98 |
| 5,682,529 | 10/1997 | Hendry et al. | 395/653 |
| 5,712,662 | 1/1998 | Miyazaki et al. | 345/173 |
| 5,715,524 | 2/1998 | Jambhekar et al. | 455/90 |

FOREIGN PATENT DOCUMENTS

WO91/19245  12/1991  WIPO ................. G06F 3/33

OTHER PUBLICATIONS

Kenneth L. Stanwood et al., "System Iconic Modeling Facility", Proceedings of the 1986 Winter Simulation Conference Proceedings, pp. 531–536.

Hewlett–Packard Patent Application S/N 08/433,771 filed on May 3, 1995.

Hewlett–Packard Patent Application S/N 08/535,724 filed on Sep. 28, 1995.

*Primary Examiner*—Jeffery Brier
*Assistant Examiner*—David L Lewis

[57] ABSTRACT

A computer device, for instance a palmtop personal organizer, has a dual-orientation display device with both portrait and landscape modes of viewing the display. The keyboard is automatically disabled when the portrait mode is selected by a user. The display has two digitized regions separated by a workspace, which is preferably also digitized to provide input commands to a processor unit when touched. The display further includes indicia, such as icons or symbols shown on the display, which may be selected to activate a computer program, function or command. These icons are slanted and permanently fixed to the display, so they may be readily understood when viewed from either the portrait or landscape modes. A method is also provided of displaying indicia for viewing from two orthogonal directions. The invention further includes a way to use an analog touch-sensitive panel, having opposing resistive layers, to trigger an interrupt line used for returning the palmtop from a sleep mode. In addition, screen image rotation is accomplished by alternately configuring sets of LCD select lines either as column lines or row lines.

12 Claims, 7 Drawing Sheets

DUAL ORIENTATION DISPLAY HANDHELD COMPUTER DEVICES

RELATED APPLICATIONS

This is a continuation-in-part application of U.S. patent application Ser. No. 08/535,411, filed on Sep. 28, 1995 now abandoned, which has at least one inventor in common herewith.

FIELD OF THE INVENTION

The present invention relates generally to portable, handheld computer display devices that accept input signals from an operator touching the display with a finger or stylus, and particularly to dual orientation displays which have both portrait and landscape modes of viewing the display. In particular, the present invention relates to a dual orientation display and associated touch-sensitive panel used in a handheld computer device, wherein the display and touch-sensitive panel are hinged to a keyboard, and to methods of driving and responding to the display and touch-sensitive panel.

BACKGROUND OF THE INVENTION

In the past, computer display devices, such as monitors used on desktops and consoles, typically had rectangular displays or screens which were oriented with the longer sides of the rectangle at the top and the bottom of the display. In graphics or word processing applications designed for output on a rectangular sheet, such as a letter or A-4 size sheet of paper, the terms "portrait" and "landscape" are commonly used to refer to the orientation of the image on the page. In the portrait mode, the shorter sides of the paper are at the top and the bottom of the image, whereas for landscape mode, the longer sides are at the top and the bottom. These terms portrait and landscape are also used herein to denote the orientation of a rectangular display screen.

In the past, the majority of display devices have been orientated in the landscape mode, typically on fixed screens mounted on consoles, desktop monitors and the like. As consumer demands for more portable devices are being met, the majority of notebook computers, laptop computers, and the smaller palmtop devices incorporate a keyboard attached to a landscape oriented screen. These portable computers are basically rectangular clam-shell devices, having a lower half carrying a keyboard hinged to an upper half that carries the display screen. The rectangular shape is easily transported, and the rectangular orientation of the keyboard allows for easy adaptation from conventional desktop keyboards.

Many graphical computer interfaces are being used in an effort to match more closely the established habits of humans when they communicate with writing. In the most natural and intuitive of these interfaces, a human user "writes" with a stylus on the surface of a computer-driven display, entering handwriting, sketching a diagram or picture, pressing a "button", etc. What actually happens, of course, is that the user stimulates a digitizer or touch-sensitive panel, co-located with the display, and the digitizer signals the position of the stylus to the computer. The computer then responds appropriately, driving the display to reproduce the path of the stylus (thus making an image of the handwriting or picture) or to signal that the button has been pressed. In this way, the stylus/digitizer/display combination becomes a close metaphor to the common pencil and paper tablet or notepad that nearly everyone uses.

One such handheld notepad device made by the Apple Computer Company, is known as the "Newton." The Newton device has only a minimal keyboard, and recognizes user inputs from a stylus, which is used to activate digitized areas on the screen. Indeed, the Newton product can be programmed to recognize a user's handwriting. The Newton device has a rectangular display screen, which is in a portrait orientation, in contrast with the landscape orientation of the hinged devices.

Some of the hinged portable computers, as well as the Newton notepad device, typically have one or more icons located around the periphery of the display. For the landscape displays, icons are oriented to be viewed in a landscape mode, whereas for the portrait display of the Newton notepad, the icons are positioned for viewing in a portrait mode. These icons are indicia, or symbols indicating either an application or program, or a specific command within a program. For example, the icon to delete a file may appear as a trash can, whereas to activate the save function of a program, the icon may be an image of a computer disk. Icons may be activated by placing the cursor over the icon and then pressing the enter key, or by using a mouse-type locator device, then keyclicking one of the mouse buttons. Using a wand-sensitive device, such as a digitized screen on the Newton notepad, the wand is pressed on the screen over the icon to activate the particular application or function. Instead of a wand, some display devices are sensitive to the touch of a finger to activate the icon's function.

It would be particularly convenient to incorporate the features of the handheld keyboard computer with those of a handheld notepad computer into a single device. In such a device, it would also be desirable for the display screen to be in a landscape mode when used as a palmtop keyboard or typing device, and in a portrait mode when used as a notepad device. There is also a need for such a device to readily interpret inputs from the touch-activated display and/or the keyboard.

SUMMARY OF THE INVENTION

According to one aspect of the present invention, a display apparatus is provided as a user interface for a computer device, with the display apparatus being readable from dual orientations, such as landscape and portrait modes, which are typically perpendicular or orthogonal to one another. The apparatus displays an image generated by the computer device. The apparatus has a display with a work area and a digitized region. The work area displays the image from the computer device, while the digitized region receives an input command for the computer device from an operator. The work area selectively displays the image from one of two orthogonal directions. The apparatus also has indicia displayed on the digitized region of the display to communicate to the operator an input command. Upon selection of the indicia by the operator, an input signal associated with the selected input command is generated for the computer device. The indicia comprises a design with an upper portion that defines an upright viewing position, with the indicia being oriented for upright viewing at an angle between the two orthogonal directions.

According to another aspect of the present invention, a display apparatus is provided for displaying an electronically generated image having an upright orientation. The apparatus has a display with a work area to display the image, and a digitized region to receive an input command from an operator, with the work area having an axis to selectively display the electronically generated image with the upright orientation either parallel to the axis or normal to the axis. The apparatus also has indicia displayed on the digitized region of the display to communicate to the operator the input command for selection by the operator, with the indicia comprising a design having an upright orientation located at an acute angle with respect to the axis.

According to still a further aspect of the present invention, a computer device is provided, including a processor unit and a display apparatus, which may be as described above.

According to another aspect of the present invention, a method is provided of displaying indicia for viewing from two orthogonal directions. The method includes the steps of determining two upright orthogonal directions from which a selected display may be viewed, and selecting indicia having an upright orientation. In an orienting step, the indicia on the display is oriented with the upright orientation being slanted with respect to each of the two determined upright orthogonal directions from which the display may be viewed.

Other aspects of the invention include touch activation circuitry for bringing a portable computer device out of a power conservation mode in response to a touch on a touch-sensitive display panel, without requiring the data processor of the computer device to periodically scan the touch-sensitive panel. The portable computer device further has hardware for allowing screen rotation between the landscape and portrait orientations with little or no participation by software. In addition, the computer device is programmed to at least partially disable its keyboard when the portrait orientation has been selected.

DETAILED DESCRIPTION OF THE PREFERRED EMBODIMENT

Figure 1:
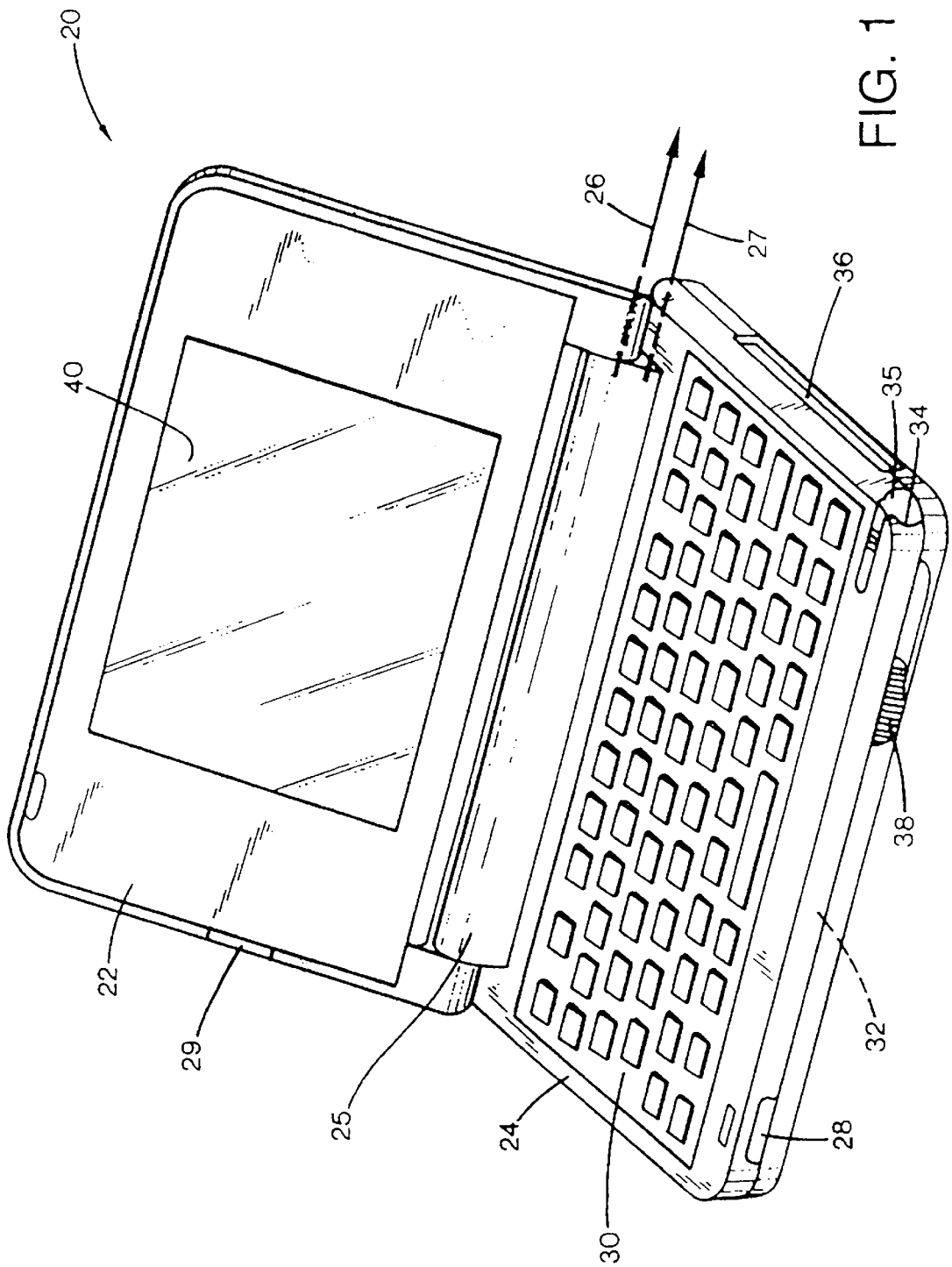
FIG. 1 is a perspective view of one form of a handheld or palmtop computer device of the present invention, which has a dual-orientation display shown in a landscape orientation for use as a keyboard or typing device.
Figure 2:
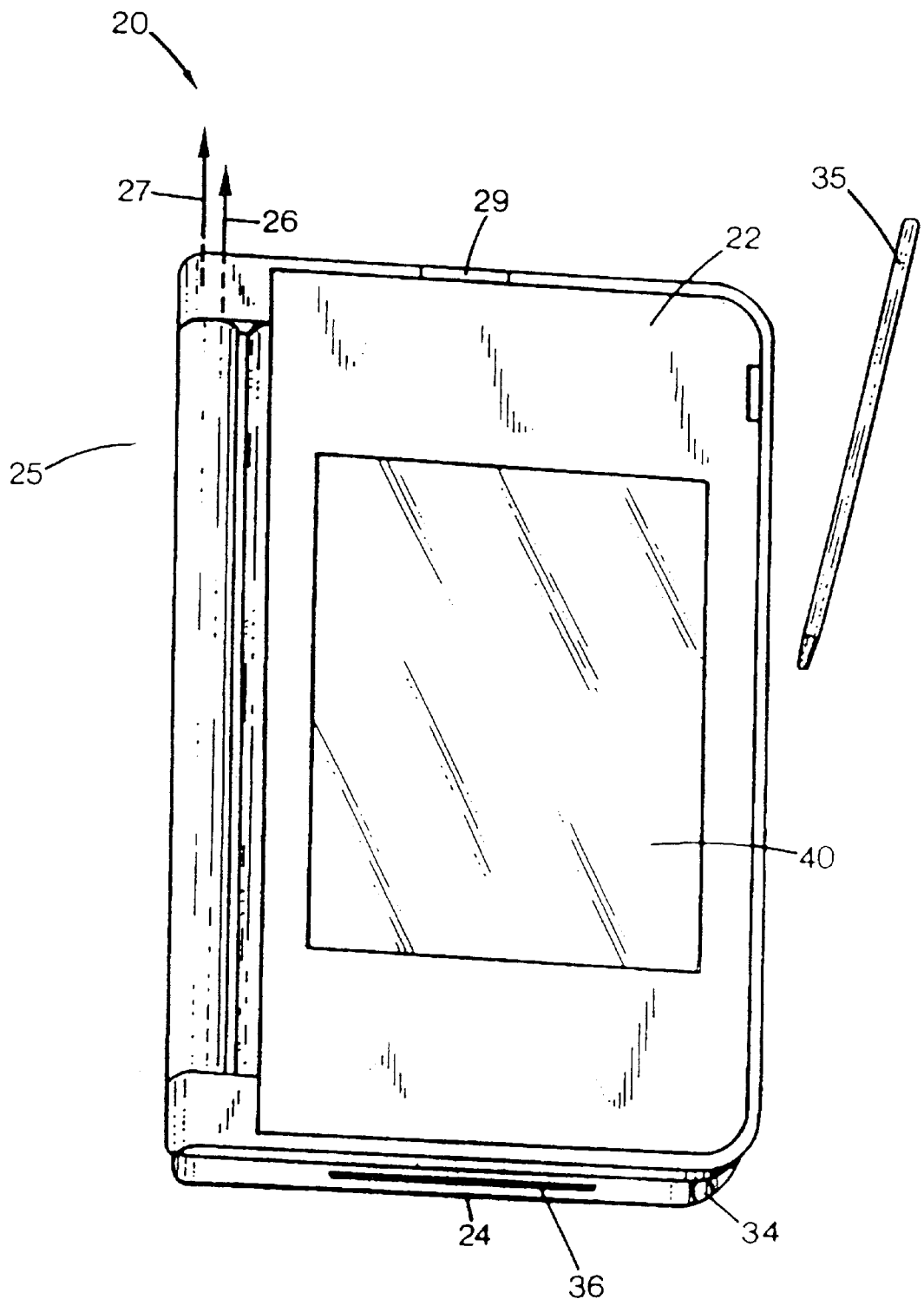
FIG. 2 is a perspective view of the palmtop computer device of FIG. 1, shown with the dual-orientation display in a portrait orientation, with the keyboard folded behind the display for use as a notepad device.

FIGS. 1 and 2 illustrate one form of a portable microprocessor-based computing system or computer device, such as a handheld personal organizer or "palmtop" computer 20, constructed in accordance with the present invention. The housing of the palmtop 20 is a clamshell design, having opposing clamshell upper and lower portions, such as a lid 22 and a base 24. The lid 22 and base 24 are pivotally attached together by a hinge mechanism 25, which has two parallel pivot axes 26 and 27. In use, the clamshell lid 22 may be closed over the base 24, then opened by releasing a conventional latch mechanism 28. A main battery receiving area is provided by a chamber defined by a portion the hinge mechanism 25 to receive a pair of replaceable batteries. A back-up battery is held by a tray 29 which is slidably received inside a chamber defined by the clamshell lid 22.

The clamshell base 24 houses a keyboard 30, including a range of alpha, numeric and function keys, which provides a typed-in input to a computer processor unit 32, housed primarily within the interior of base 24. The base 24 also has a chamber 34 which slidably receives a separate wand unit or stylus 35, which may be used to provide operator input commands to the processor unit 32, as described further below. The base 24 also has an auxiliary device card chamber 36 that slidably receives a PCMCIA card (not shown), which is removed using slide button 38. Such an optional PCMCIA card conforms to standards established by the Personal Computer Memory Card International Association (PCMCIA). A PCMCIA card plugs into a connector housed within the base 24 to provide additional features to the processor unit 32, such as modem capability, extra memory, facsimile capability, higher math functions, sound, dictionary/thesaurus functions, or network interfacing. Thus, the palmtop 20 may be readily adapted to a variety of specialized uses.

The clamshell lid 22 supports a display device, panel, or screen 40, constructed in accordance with the present invention. The hinge 25 advantageously allows the keyboard base 24 to be folded in a back-to-back relationship with the lid portion 22, as shown in FIG. 2. As used herein, the orientation of the display 40 in FIG. 1 will be referred to as either a landscape, typing or keyboard mode, whereas the view of FIG. 2 will be referred to as the portrait, writing or notepad mode.

Display 40 includes a touch-sensitive panel that can be used for operator input. Specifically, the operator can touch specific portions of the display with a hand-held stylus 35. Palmtop 20 has hardware and software that recognize the position that has been touched. Depending on the operating state of the palmtop or the position relative to the display that is touched, the palmtop might respond to a touch by darkening the corresponding portion of the screen, thus allowing the user to draw graphics or letters. In other situations, a touch might be interpreted as a command.

In the keyboard mode of FIG. 1, either the keyboard, the stylus, or both may be used to provide an operator input command signal to the processor unit 32. Instead of using the stylus 35, some input commands may be activated by touching the display screen 40 with an operator's finger.

The manner in which the palmtop 20 interfaces with a user will be described first, before discussing how the device operates to accomplish these functions.

Figure 3:
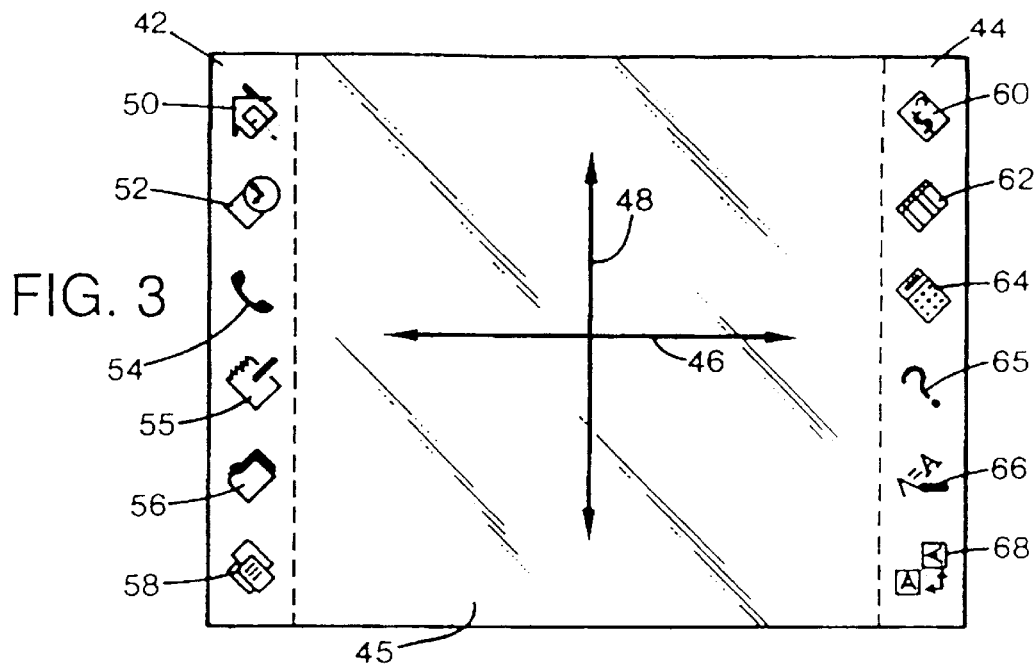
FIG. 3 is an enlarged plan view of the display screen of FIG. 1 in a landscape orientation, with the display showing two groups of dual-orientation readable icons.
Figure 4:
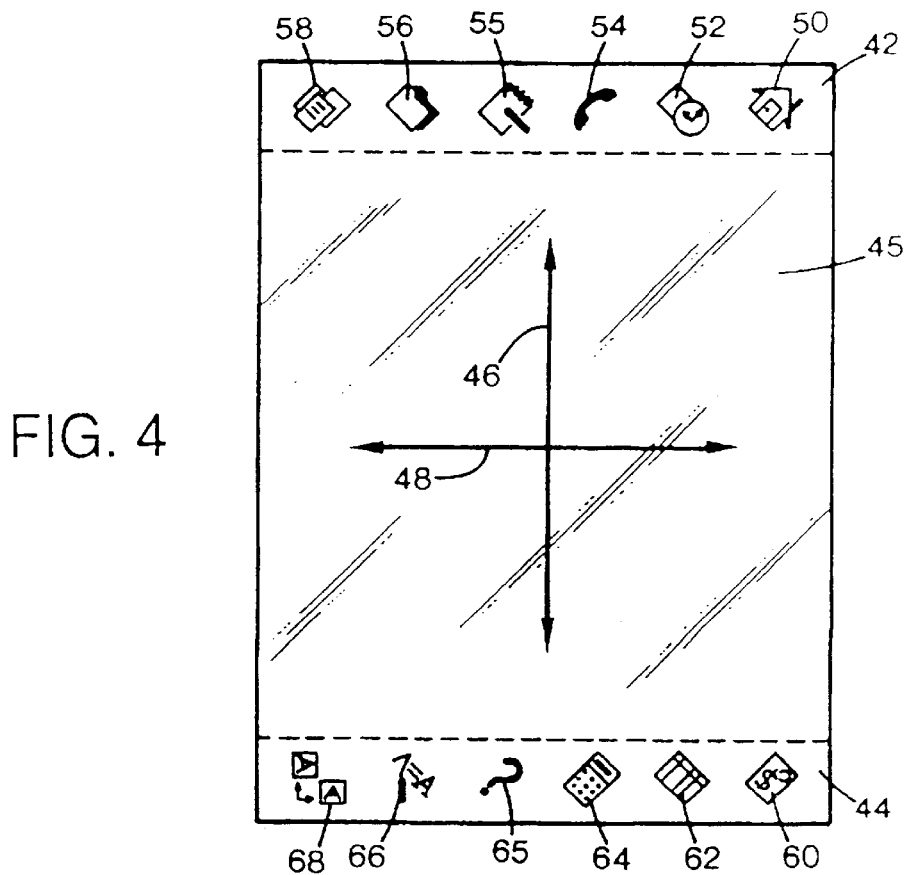
FIG. 4 is an enlarged plan view of the display screen of FIG. 1 in a portrait orientation, rotated 90° from the view of FIG. 3.

As shown in detail in FIGS. 3 and 4, the display device 40 has two digitized regions 42 and 44 separated by a work space 45, which is preferably also digitized. The workspace 45 is preferably square, although rectangular, oval, hexagonal or other shapes may also be implemented. As shown in FIGS. 3 and 4, the display 40 may be, circular, square or oblong in shape, such as oval or elliptical, or as illustrated here, rectangular, having a major axis or portrait axis 46, and a minor axis or landscape axis 48. The digitized regions 42 and 44 are sensitive to a touch from the operator's finger or from the stylus 35 to active one of plural icons, which are indicia or symbols indicating a particular computer application, or a command or function within an application, such as icons 50, 52, 54, 55, 56 and 58 within region 42, and icons 60, 62, 64, 65, 66 and 68 within region 44. The icons may be radially symmetrical, such as a circle, that have an infinite number of upright viewing directions, but the supply of such radially symmetrical icons is readily exhausted. The illustrated icons 50–68 are non-radially symmetrical, and have a single upright viewing direction. Indeed, the function associated with an icon may also be written or abbreviated in text within the digitized regions 42, 44 adjacent the associated icon, but such text has been omitted from the drawings for clarity. The illustrated icons may activate the following functions, for instance:

| Icon | Function | Textual Abbreviation |
|---|---|---|
| 59 | Home Screen | "Home" |
| 52 | Appointment Book | "Appt" |
| 54 | Phone Book | "Phone" |
| 55 | Notepad | "Note" |
| 56 | Database | "Data" |
| 58 | Jotter | "Jotter" |
| 60 | Finance | "Finance" |
| 62 | Spreadsheet | "Sheet" |
| 64 | Calculator | "Calc" |
| 65 | Help | "Help" |
| 66 | Graffiti | "Graffiti" |
| 68 | Portrait or Landscape Display | "Rotate" |

Touching one of the icons 50–68 generates an input signal to the processor unit 32. The illustrated icons 50–68 are also referred to as "hard icons" because they are permanently located in-control areas adjacent the work surface 45, and remain visible even after the palmtop 20 has been turned off.

The palmtop display 40 interacts with the operator in an intuitive manner, closely resembling the use of pencil and paper. In the illustrated embodiment, the display 40 comprises a planar liquid crystal graphical display, overlaid with a transparent planar digitizer layer. While a liquid crystal display 40 is shown, other varieties of displays, such as electroluminescent, may also be used if higher power consumption is tolerable. The overlying digitizer layer is composed of layers of both electrically conductive and insulating material arranged so that, when the digitizer surface is pressed, measurable resistances are generated. These resistances are then interpreted to determine the surface position where the pressure was applied, and the processor unit 32 then correlates the location to a selected input command. Both the digitizer layer and liquid crystal display have active areas which are nominally the same size so they can be superimposed during manufacture.

The processor unit 32 communicates display drive signals to enable the generation or removal of image elements ("pixels") anywhere on the active area workspace 45 of the display. In a preferred embodiment, a pointed end of the stylus 35 is used for writing or inputting commands, while the opposite end is used to erase pixels, similar to the operation of a conventional pencil. Note that the display need not be co-located with the digitizer layer, although such a system would clearly detract from the intuitive analogy to pencil and paper. Another variation of display 40 locates a non-transparent digitizer layer under a flexible display. A further variation of display 40 may employ a non-planar, transparent digitizer and an inductive winding on the spherical surface of a cathode-ray tube display.

Much of the operation of this type of computer system 20 consists of the operator moving the pointed writing end of stylus 35 in a path on the surface of the work surface 45, using enough pressure to activate the digitizer. Preferably, the level of pressure required approximates that required to make a legible mark with a pencil on a piece of paper. If the computer 20 is expecting a handwriting or drawing input, then the system generates a graphical trace on display 40, duplicating the stylus path and located directly under it. In another mode, graphical "buttons," appearing in the workspace 45 or supplied by the hard icons 50–68 indicate command choices and the operator is expected to select a command by pressing over the button with the stylus 35.

Since the display 40 may be viewed from either orthogonal orientation (landscape or portrait), and is usable in both orientations, if the hard icons 50–68 are totally upright when viewed from one direction, they cannot be viewed in a normal manner from the other direction. Particularly in a handheld device, such as the personal organizer 20, space is at a premium to maintain portability of the device. Dividing the display 25 into the work space 45 and the digitized regions 42, 44 forces the workspace 45 and regions 42, 44 to compete for the available display space. Moreover, the larger the area devoted to digitized regions 32, 34, then the greater is the ultimate cost of the computer 20. Thus, it is advantageous to have a minimally sized region dedicated solely a digitized region for the hard icons 50–68, whether the palmtop 20 is being used as a keyboard, or as a notepad.

Consumer acceptance of hand held devices is often based on their ease of use, with the simpler devices being more appealing to a variety of consumers. Thus, it is advantageous to simplify the palmtop's user interface as much as possible. To this end, the hard icons 50–68 are slanted with respect to both the portrait and landscape modes of viewing display 40. For example, each hard icon 50–68 is preferably oriented anywhere between 20° and 70° from the upright minor axis 48, when viewed in the landscape mode. A preferred optimal rotation from either the landscape axis 48 or the portrait axis 46 is a 45° angle of rotation. By having sets of slanted icons 50–68 which service both keyboard and notepad uses, visual clutter of the display 40 is kept to a minimum. Furthermore, the user may become accustomed to locating an icon in a certain position. By having these dual-orientation icons 50–68 permanently located on the display 40, the operator may readily locate a particular icon in either orientation, negating the need to become accustomed to a completely new arrangement of icons switching between viewing modes. Thus, use of the dual-orientation icons 50–68 yields a simple, reliable, low cost and versatile personal organizer 20.

The illustrated dual-orientation readable icons 50–68 may be advantageously read from either the landscape or portrait orientation of display 40. Additionally, the hand held computing device 20 may be made smaller, with a smaller footprint (physical space occupied) for the housing of organizer 20. Moreover, having one set of hard icons instead of two as in the previous devices, helps to conserve the valuable area of display 40 for the worksurface 45. Furthermore, the use of the illustrated dual-orientation icons 50–68 significantly conserves screen space, as opposed to using two sets of icons oriented orthogonally to one another, as on devices of the past. Moreover, display 40 appears to be simplified, since only one set of hard icons is required. And finally, the presence of the icons 50–68 shown slanted at an angle, provides an intuitive message to the user, that the device 20 may be used in either a keyboard or a notepad orientation.

Power Conservation Mode

Palmtop 20, similarly to many handheld devices, has a power-conservation mode. In devices such as this that typically use batteries, power conservation is critical to ensure against premature exhaustion of power reserves. One way to conserve power is to remove power from components when they are not in use. However, this is often impractical. Another way to reduce power consumption is to put components such as data processors or microprocessors in a "sleep" mode in which they consume very little power. Many microprocessors have such a sleep mode. Returning a processor from such a mode can usually be accomplished by changing the voltage on an interrupt line or other such "wake-up" line.

It works well for a handheld device to automatically enter a sleep mode when there has been a defined period without any input from a user. In many cases the device is brought back to an active state by pressing an "on" button. It is more desirable, however, to wake the processor by monitoring for normal user input such as a key press.

When using a touch-sensitive panel, in particular, it is desirable to wake the processor when the user touches the panel with a finger or the stylus. Some devices provide this feature. Such devices conventionally detect a touch by periodically "waking" the device's data processor to scan the touch-panel. If no touch is detected, the data processor re-enters its sleep mode.

While this prior art method works, it consumes significant power to perform such periodic scanning. In contrast, the preferred embodiment of the invention uses an interrupt to signal the data processor to return from its sleep mode. Thus, the system can remain in a suspended, sleeping, or power-conservation state until a contact or touch is made on display 40, which then causes an interrupt to wake the system immediately.

The digitizer or touch-sensitive panel in this embodiment of the invention is implemented using resistive overlay technology. Such technology utilizes a transparent sensor placed over a display screen to detect the position of a passive pen or stylus as it is pressed or touched against the surface of the display screen.

Figure 5:
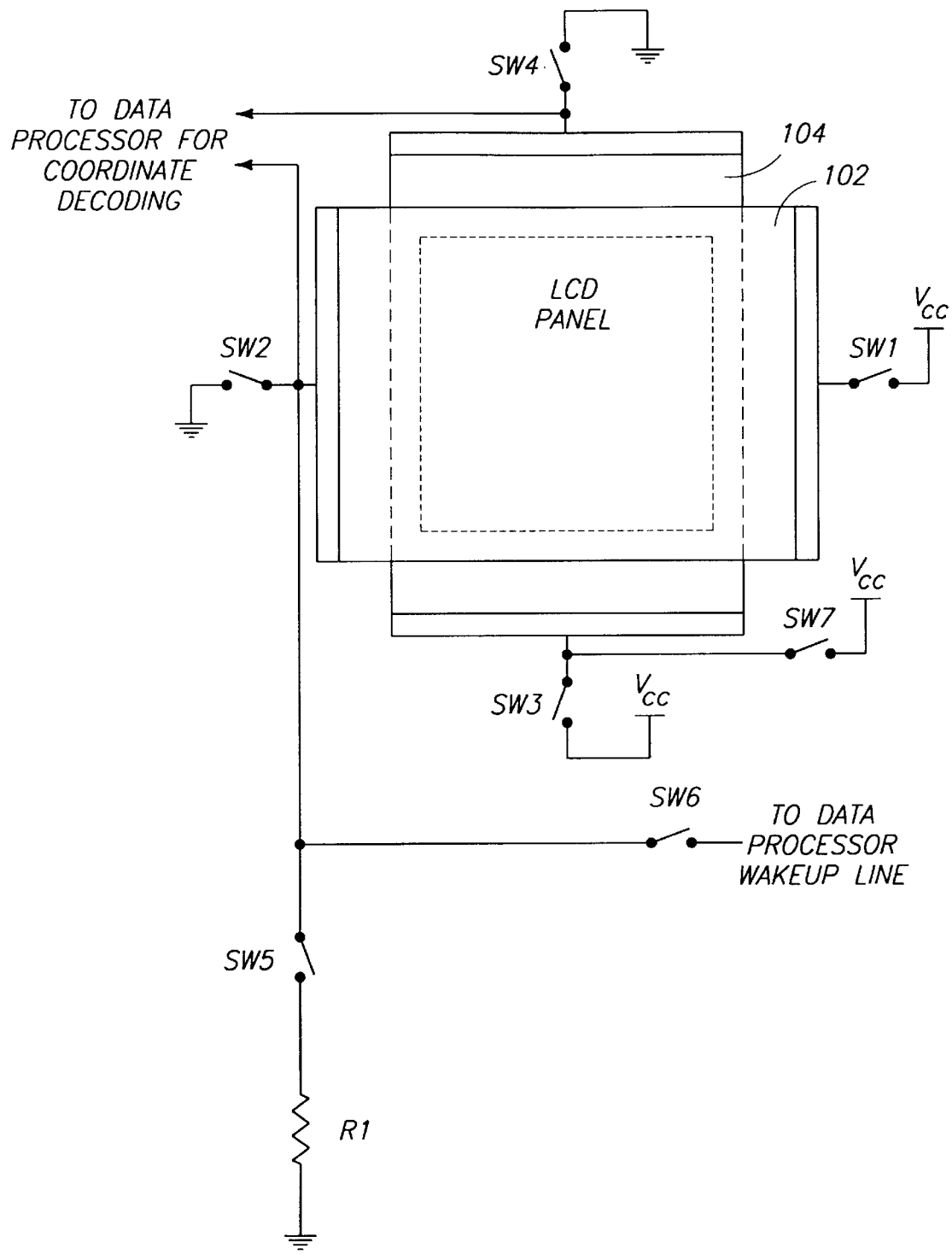
FIG. 5 is a diagrammatic representation of a touch-panel and associated electronics in accordance with the invention.

FIG. 5 shows the elements of a resistive sensor and associated electrical or electronic controls used in conjunction with the data processor of palmtop 20 to detect the coordinates of a touch on display 40. The resistive sensor itself is formed by first and second opposing resistive layers that couple electrically with each other in response to a touch. A data processor of palmtop 20 is connected to determine coordinates of a touch on the resistive sensor by applying and measure voltages to and from these layers. This data processor may be the device's primary microprocessor or may be a smaller, auxiliary microcontroller used for I/O functions. In the preferred embodiment, the data processor is a low-cost 8-bit microcontroller that is used for display, keyboard, and touch-panel control.

More specifically, the touch-panel comprises a flexible top layer 102 (e.g., PET film) and a rigid bottom layer 104 (e.g., glass) coated with transparent conductive material such as indium tin oxide (ITO) on the inner surfaces. These two layers are sandwiched together, spaced slightly from each other by a dielectric material around perimeter edges and by non-conductive spacers such as very small ink bumps in the active digitizing area. When there is no force exerted on flexible top layer 102, no electrical connection is made between the two layers.

When voltages are applied across the conductive inner surfaces of the layers, a linear drop in potential can be measured across the conductive material analogous to the action of an analog voltage divider. When a connection is made between the layers while applying a voltage to a first of the layers and using a second of the layers as a high-impedance terminal to measure the resultant voltage, the measured voltage can be mapped to the location along the axis of the first layer at which contact is being made between the layers. By then applying voltage to the second layer, and measuring the resulting voltage at the first layer, the location of contact along the axis of the second layer can be determined. Since the layers are aligned at 90° to each other, an orthogonal coordinate pair representing the point of contact between the two layers can be calculated. Thus, by scanning or alternately applying voltage to each of the two layers and measuring the result at the other layer, coordinate pairs indicating the presence and movement of operator touches can be obtained.

FIG. 5 shows the scanning circuits, under control of a data processor of palmtop 20, for alternately applying voltage across each resistive layer and measuring the resulting voltage from the other layer to determine coordinates of a touch on the touch sensitive panel. Top layer 102 is connected to a potential of $V_{cc}$ through a first pair of switches SW1 and SW2. These switches are connected to apply $V_{cc}$ across a first axis of top layer 102. Bottom layer 104 is connected to $V_{cc}$ through a second pair of switches SW3 and SW4. $V_{cc}$ is connected by these switches across bottom layer 104 along a second axis that is perpendicular to the first axis.

The components described above allow conventional operation of the touch-panel in a coordinate decoding mode, employing voltage divider principles to determine touch coordinates. However, the configuration of FIG. 5 also includes a "wake-up" mode in which the analog or resistive touch-panel is used as a digital switch. To accomplish this, palmtop 20 includes a touch activation circuit that can be enabled by the data processor to apply a voltage to a first of the resistive layers and to configure a data-processor wake-up line to respond to a change in voltage at the second of the layers. More specifically, a switch SW7 is provided for providing $V_{cc}$ to bottom layer 104 during the "wake-up" mode of operation. Another switch SW5 connects top layer 102 through a pull-down resistor R1 to ground, thus biasing top layer 102 to ground. A switch SW6 connects top layer 102 to the wake-up line of the data processor. The wake-up line is typically an interrupt line that can be electrically activated to return the data processor from a power-conservation mode. In the preferred embodiment, the switches are either transistors or tri-state buffers under the master control of the data processor.

The data processor is programmed to disable the scanning circuits and to enable the touch activation circuit just prior to entering its power-conservation mode. More specifically, switches SW1, SW2, SW3, and SW4 are opened to disable scanning of the touch-panel. Switch SW7 is closed to apply $V_{cc}$ to bottom layer 104, and switch SW5 is closed to bias top layer 102. The wake-up line is connected to respond to a change in voltage of top layer 102—it is connected through switch SW6 to be electrically activated by a touch on the touch-sensitive panel. In response, the data processor enters its power-conservation mode, after also configuring other components to enter power-conservation modes.

As long as there is no touch on the touch-panel, $V_{cc}$ will stay static on the bottom layer. Since it is insulated from the top layer, little or no current will flow during this time. Similarly, no current (except a small leakage current) will flow through biasing resistor 110. When a touch occurs, $V_{cc}$ will be applied to bottom layer 104, thus activating the interrupt line of the data processor. The data processor, in response, quits its power-conservation mode, opens switches SW5, SW6, and SW7, and resumes normal processing including scanning for the positional coordinates of touches on the touch panel using switches SW1, SW2, SW3, and SW4. The data processor also wakes other components of palmtop 20 as appropriate.

This configuration allows palmtop 20 to be wakened from sleep mode without requiring periodic scanning of the touch-sensitive panel, making possible a power-conservation mode in which virtually no power is required by the touch detection mechanism.

Keyboard Disabling

The particular arrangement of the keyboard and display described above result in the following situation: when the display is in portrait mode, the primary method of input is expected to be the pen, with the keyboard folded away behind the display; when typing, however, the device will usually be configured and used as a typical laptop computer, with the keyboard supported horizontally and the display configured in landscape mode.

With the keyboard folded back-to-back with the display, it is important to prevent the user from mistakenly entering data via the keyboard. At the same time, the user should be able to turn the palmtop on or off with the keyboard. Thus, the keyboard should be only partially disabled when folded back. It would be desirable to somehow alert the device's data processor to the fact that the keyboard has been folded back so that it could be partially disabled through software. It would be even more desirable to accomplish this without added hardware, and without requiring a user to take special steps.

This is accomplished in the preferred embodiment by partially disabling keyboard functions when the device is configured in portrait mode. Alternatively stated, palmtop 20 includes means (formed by the palmtop's data processor) for at least partially disabling the keyboard in response to a user's activation of an indicia to change to the portrait display orientation. This works well because of the fact that portrait orientation is used whenever the keyboard is folded back.

More specifically, the preferred embodiment of the invention includes a display screen, already described in some detail, on which an image can be displayed in first and second orientations—referred to above as landscape and portrait orientations. The preferred embodiment also includes a hard icon 68 (FIGS. 3 and 4) that upon activation by an operator changes between the landscape and portrait orientations.

To determine whether to disable certain keyboard keys or functions, the data processor of palmtop 20 monitors activation of indicia 68 by the operator, and partially disables the keyboard in response to said activation of the indicia to change to portrait mode. The keyboard is re-enabled when the user activates the same indicia to return to landscape mode. This provides a very convenient solution, without requiring any added sensing hardware or conscious user intervention.

Screen Rotation

The device described above requires a way to change display orientation. It is desirable to use off-the-shelf LCD controller and drive components operating in standard and pre-defined video modes. Using such components and modes, however, display rotation must be achieved external to the controller. One way to accomplish this is through software, by simply rearranging a display bitmap in buffer memory. This approach, however, requires participation by various application programs that might wish to write directly to the buffer memory.

To provide transparency to application programs, the preferred embodiment of the invention uses hardware post-processing to rotate the display image relative to the physical display 40.

Figure 6:
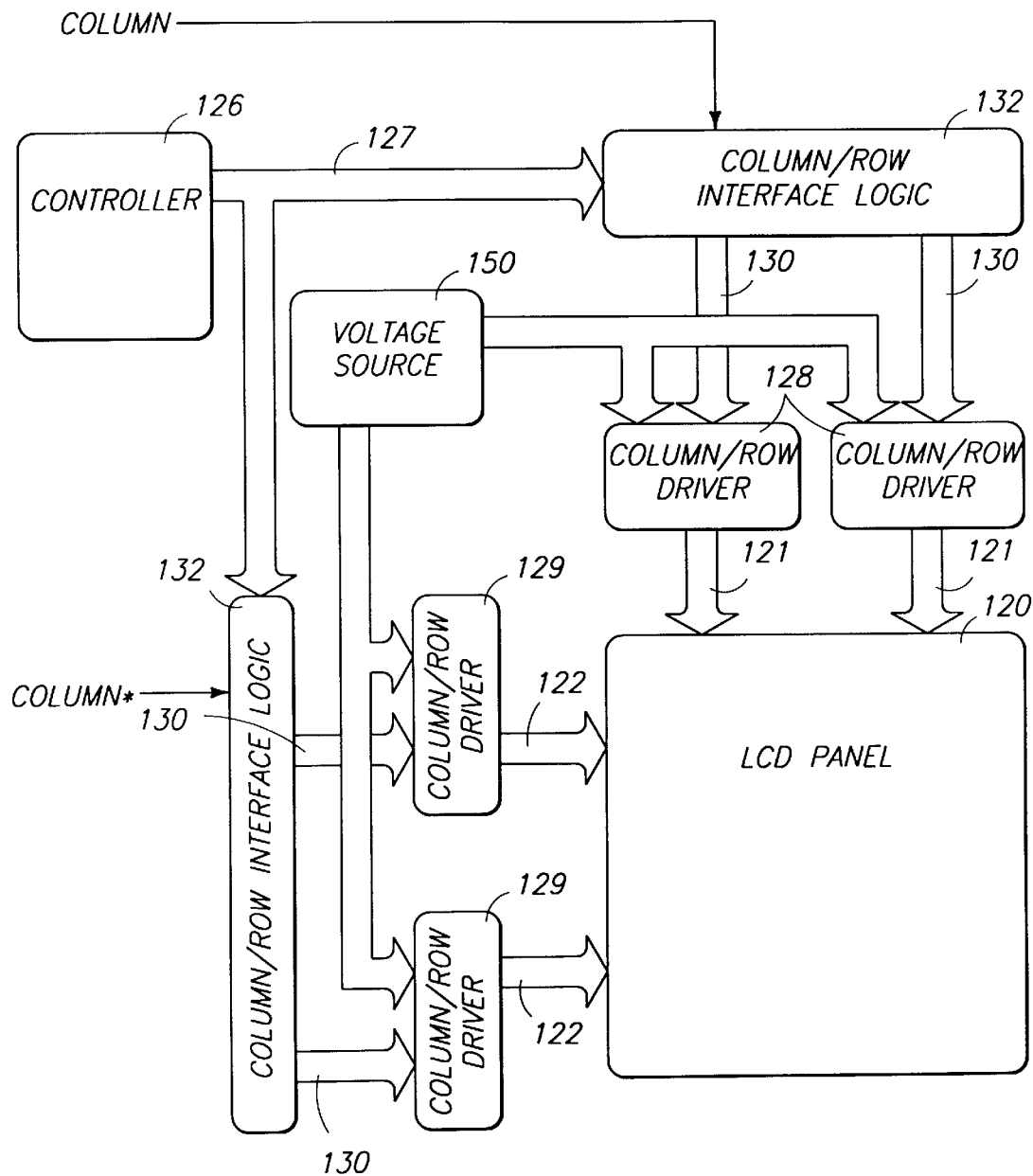
FIG. 6 is a block diagram of screen driving and rotation circuitry in accordance with the invention.

FIG. 6 shows a display system for accomplishing screen rotation in accordance with the preferred embodiment of the invention. The system includes an LCD matrix display panel 120 having first and second sets of electrodes 121 and 122, normally referred to as column or segment electrodes and row or common electrodes. In the following description, the electrodes are referred to as select lines. Each set of select lines can function as either a set of row lines or as a set of column lines. LCD panel 120 is a black and white FSTN (film compensated super twisted neumatic) LCD display with a resolution of 240×240 pixels, available from Optrex Corporation of Tokyo, Japan.

The display system includes an LCD drive configuration that is responsive to a rotation signal to alternatively (a) drive the first set of select lines as column lines and drive the second set of select lines as row lines, and (b) drive the first set of select lines as row lines and drive the second set of select lines as column lines. This is implemented by a display controller 126 having a set or plurality of control outputs 127, and a plurality of drive circuits connected to drive the first and second sets of select lines, respectively, of the display panel. The drive circuits are identified in FIG. 6 as a first set of drive circuits 128 corresponding to first set of select lines 121 and a second set of drive circuits 129 corresponding to second set of select lines 122.

Display controller 126 is an LCD controller integrated into a system ASIC, manufactured as part number VG230 by Vadem of San Jose, Calif.

To minimize the number of components required in the driving circuits, each of the drive circuits of sets 128 and 129 comprises an 80-channel output LCD driver. Specifically, each driver is a KS0083, manufactured by Samsung of South Korea. This type of driver can be operated in either a column operating mode or in a row operating mode, depending on whether it is driving its LCD select lines as columns or rows. Thus, the same component type can be used for driving both the rows and the columns of LCD panel 120. Each driver has a set of control inputs 130. For purposes of illustration, only two drivers are shown in each of sets 128 and 129, although three are used in each set in the actual implementation.

One or more logic circuits 132 are interposed between the display controller and the drive circuits. The logic circuits connect and provide signal connections between control outputs 127 of display controller 126 to control inputs 130 of the drive circuits in accordance with the operating mode of each drive circuit. Logic circuits 132 are switchable between first and second states to rotate a displayed orientation relative to the display panel. When switched to the first state, the logic circuits have outputs that configure the first set of drive circuits to operate in their column mode and the second set of drive circuits to operate in their row mode. In the second state, the logic circuits have outputs that configure the first set of drive circuits to operate in their row mode and the second set of drive circuits to operate in their column mode. Furthermore, the logic circuits change the signal connections between the control outputs of the display controller and the control inputs of the drive circuits depending on whether they are operating in row mode or column mode. Specifically, those control outputs 127 that need to be connected to drive circuits associated with columns are connected or routed by logic circuits 132 to whichever drive circuits are currently configured to drive column select lines. Similarly, those control outputs 127 that need to be connected to drive circuits associated with rows are connected or routed by logic circuits 132 to whichever drive circuits are currently configured to drive row select lines.

Figure 7:
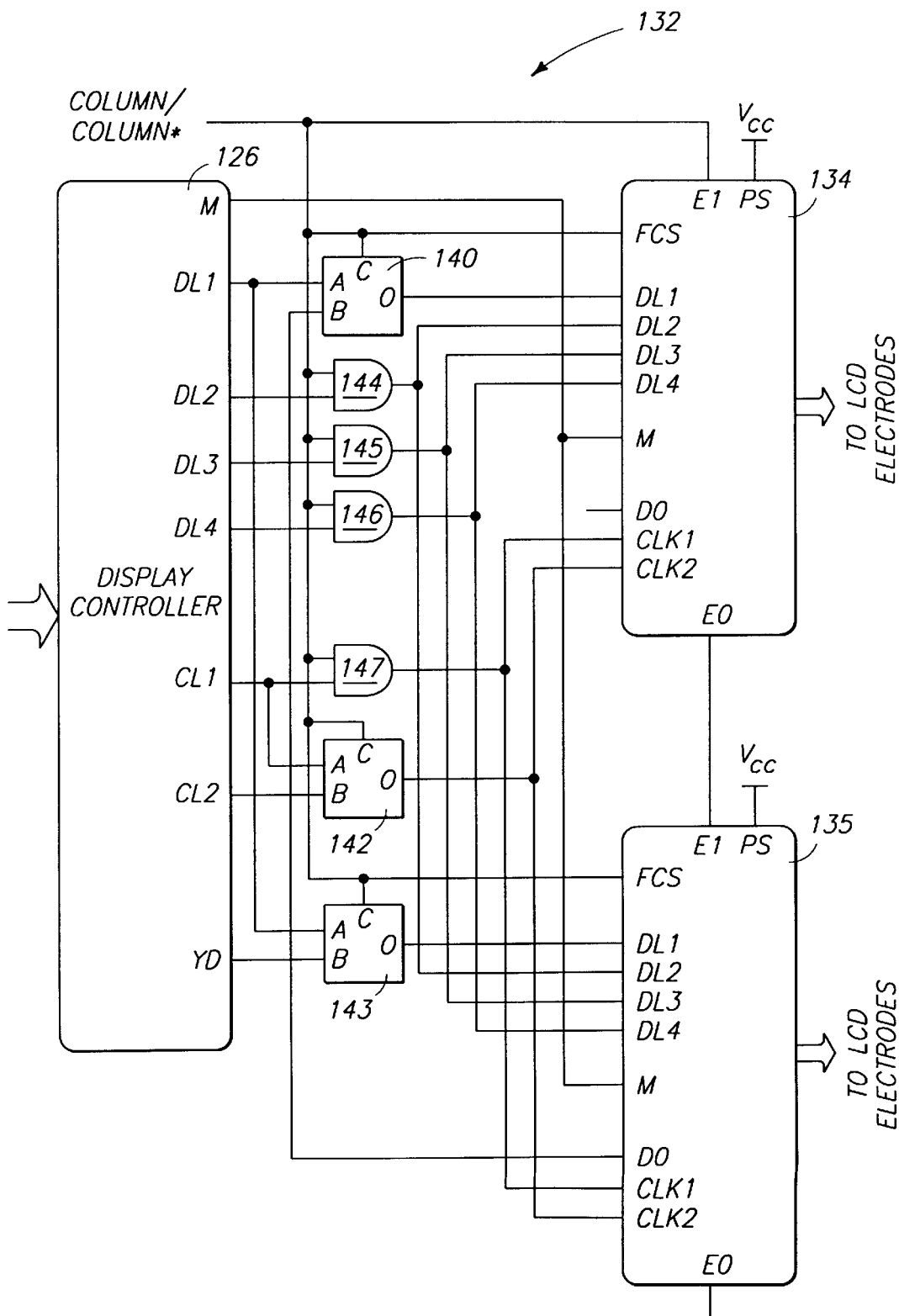
FIG. 7 is a schematic diagram of screen driving and rotation circuitry in accordance with the invention.

FIG. 7 shows details of connections and electronics between display controller 126 and a set of drive circuits comprising first and second drive circuits 134 and 135. FIG. 7 assumes that only two drive circuits are used for each set of drive circuits, and that these drive circuits are chained in the manner shown. If additional drive circuits are used, they are chained in a similar manner.

Details shown in FIG. 7 will of course vary depending on the actual selection of display controller and drive circuits. Thus, while FIG. 7 is useful to illustrate the invention, actual implementations are likely to vary significantly. Reference should be made to the specifications of the display controller and drive circuits for further details regarding interconnections of these components in row and column modes.

In the illustrated configuration, each drive circuit 134 contains the following control inputs: FCS, PS, DL1, DL2, DL3, DL4, M, CLK1, CLK2, D0, E0, and E1. FCS and PS consists of lines that control the operating mode of the drive circuit. DL1–DL4 are data input lines. Only DL1 is used in row mode, while all four of these input lines are used in the column mode in the preferred embodiment described herein. M is an AC inversion signal used in conjunction with driving LCD displays. CLK1 and CLK2 are clock signals. In the column mode, CLK2 latches bits of serially input data into the drive circuit, while CLK1 latches rows of input data into a buffer circuit for output to LCD select lines. In the row mode, only CLK2 is used to latch row data. E0 and E1 are enable signals that are used to chain a plurality of drive circuits. D0 is another signal that is used for chaining drive circuits.

The control outputs of display controller 126 correspond generally to the control inputs of drive circuits 134. Thus, the control outputs include YD, M, DL1, DL2, DL3, DL4, CL1, and CL2 outputs.

The desired interconnections between display controller 126 and drive circuits 134 depend on whether the drive circuits are operating in row mode or column mode. The following table shows the desired connections from each control output, for each operating mode of a drive circuit 134:

| DISPLAY CONTROLLER OUTPUT | DRIVE CIRCUIT INPUT (COLUMN MODE) | DRIVE CIRCUIT INPUT (ROW MODE) |
| --- | --- | --- |
| M | M | M |
| YD | none | DL1 of first chained driver |
| DL1 | DL1 | none |
| DL2 | DL2 | none |
| DL3 | DL3 | none |
| DL4 | DL4 | none |
| CL1 | CLK1 | CLK2 |
| CL2 | CLK2 | none |

The logic circuit 132 shown in FIG. 7 between display controller 126 and drive circuits 134 and 135 implements these connections using three multiplexer components 140, 142, and 143, and four AND gates labeled 144, 145, 146, and 147. Multiplexer 140 has two inputs connected respectively to DL1 of display controller 126 and the D0 output of second drive circuit 135. It has an output connected to DL1 of first drive circuit 134. Multiplexer 142 has two inputs connected to CL1 and CL2, respectively, of display controller 126. It has an output connected to CLK2 of drive circuits 134. Multiplexer 143 has two inputs connected respectively to YD and DL1 of display controller 126. The output of Multiplexer 143 is connected to DL1 of second drive circuit 135. Each of the multiplexers has a control input C connected to a signal labeled COLUMN/COLUMN*. This signal is also connected to input FCS of the drive circuits to switch them between column and row operating modes. In actuality, COLUMN and COLUMN* are two different signals, and each logic circuit 132 uses only one of these signals: as shown in FIG. 6, one logic circuit 132 uses COLUMN and the other logic circuit 132 uses COLUMN*. The value of the COLUMN signal depends on whether the display is to be operated in landscape or portrait mode. The COLUMN* signal is the inverse of the COLUMN signal.

One input of each of the AND gate functions as a control, and is connected to signal COLUMN/COLUMN*. The other inputs of the AND gates are connected to DL2, DL3, DL4, and CL1, respectively, of display controller 126. The COLUMN/COLUMN* signal is inverted as appropriate so that the right signals will be supplied to the drive circuits depending on whether they are to operate in column or row modes.

The LCD drive configuration also includes one or more voltage sources 150 (FIG. 6), that provide a first set of voltages for select lines that are being driven as column lines, and a different second set of voltages for select lines that are being driven as row lines.

The column and row lines of LCD panels are typically driven by what are referred to generically as "select" voltages and "non-select" voltages. It is usual for different non-select voltages to be required for column and row lines, respectively.

Figure 8:
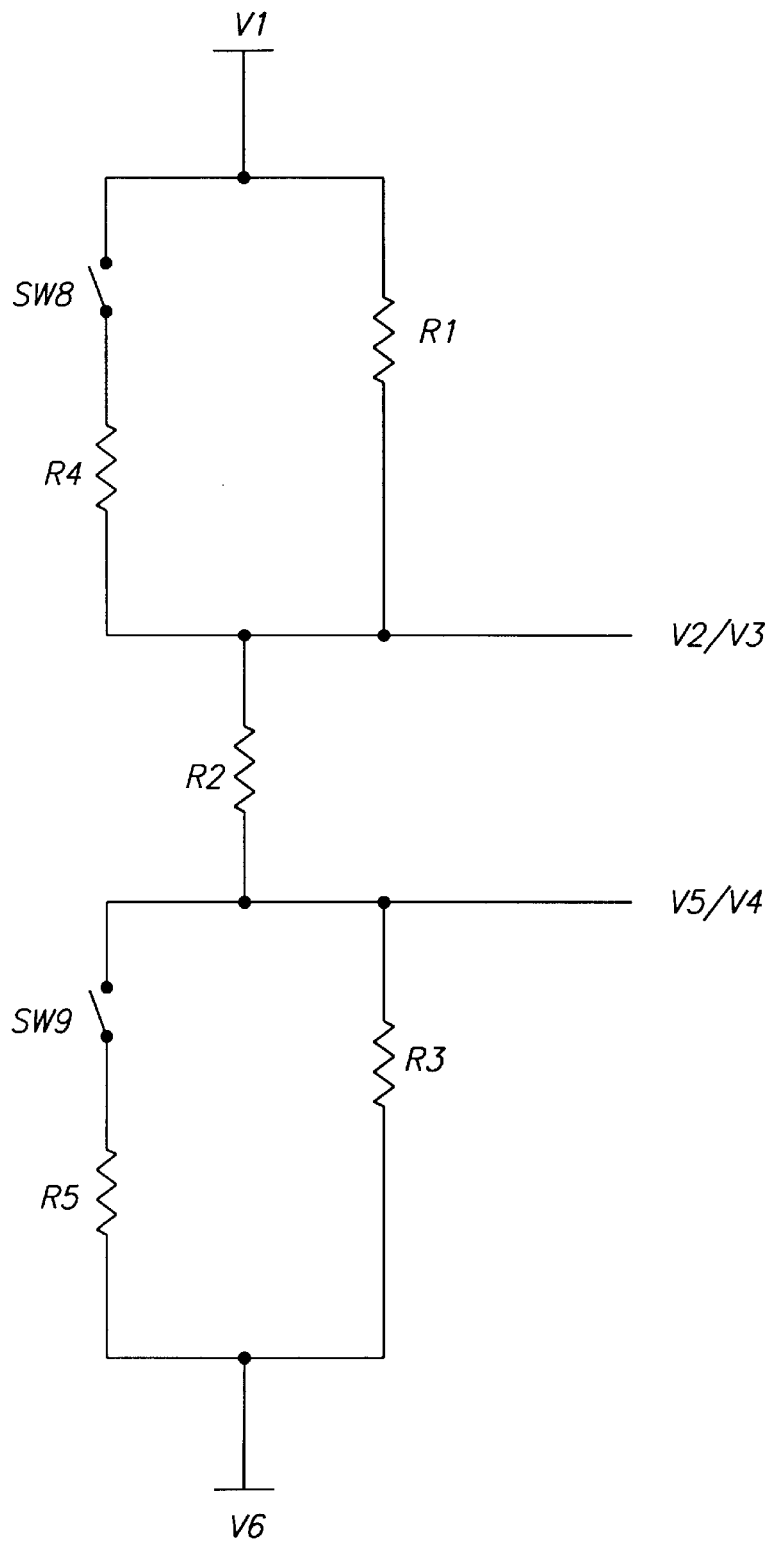
FIG. 8 is a schematic diagram of a voltage divider circuit in accordance with a preferred embodiment of the invention.

In the preferred embodiment, a programmable voltage divider is associated with each of the first and second sets of drive circuits, respectively. FIG. 8 shows an embodiment of such a programmable voltage divider.

The voltage divider comprises a series of resistances R1, R2, and R3, connected from V1 to V6. V1 and V6 are voltages normally used as one pair of select voltages for both row and column select lines. The voltage divider also produces intermediate voltages V2/V3 and V5/V4. The identifiers V2 and V5 refer to non-select voltages normally used only for row select lines. V3 and V4 refer to different non-select voltages normally used only for column select lines.

Additional resistances R4 and R5 are connected in parallel with resistances R1 and R3, respectively. Switches SW8 and SW9 are used to switch resistances R4 and R5 in and out of the circuit to vary the voltages of V2/V3 and V5/V4. If the resistances are selected appropriately, one set of voltages, appropriate for segment select lines, is produced when the switches are open. Another set of voltages, appropriate for row select lines, is produced when the switches are closed.

Switches SW8 and SW9 are implemented electronically with P-channel and N-channel MOSFETs, controlled by COLUMN and COLUMN*. The output voltages are of course buffered in the actual implementation.

There are two voltage dividers such as the divider 150 shown, associated respectively with the first and second sets 128 and 129 of drive circuits. The switches of one voltage divider are controlled by COLUMN, and the switches of the other voltage divider are controlled by COLUMN*. Thus, one voltage divider produces V2 and V5 (for row drive circuits), while the other voltage divider produces V3 and V4 (for column drive circuits).

The resistances are calculated to produce whatever non-select voltages are required by the particular LCD panel being used.

The invention thus includes methodological steps of connecting a first set of LCD select lines to be driven as column lines, and connecting a second set of LCD select lines to be driven as row lines. In response to receiving a rotation signal, in this case COLUMN/COLUMN*, a step is performed of connecting the first set of select lines to be driven as row lines, and the second set of select lines to be driven as column lines. The invention further includes varying drive voltages to the first and second sets of select lines, respectively, in response to a rotation signal or in accordance with whether the sets of select lines are operating in their column or row modes.

Using this method of rotation, very little participation is required by system software. Of course the software is required to monitor when rotation is desired, and to generate the COLUMN/COLUMN* signal. In addition, the operating software must intervene in some cases to output data to the display controller from bottom to top rather than from top to bottom when operating in the portrait mode. This step is only necessary when the drive circuit is only capable of unidirectional data shifting. If bi-directional data shifting is available, this step is not required.

In compliance with the statute, the invention has been described in language more or less specific as to structural and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A display system comprising:
   a display panel having first and second sets of select lines;
   a display controller having a plurality of control outputs;
   first and second drive circuits connected to drive the first and second sets of select lines, respectively, of the display panel, wherein the drive circuits can be operated either in a segment mode or in a common mode, the drive circuits having control inputs; and
   logic circuits between the display controller circuit and the drive circuits, the logic circuits providing signal connections between the control outputs of the display controller and the control inputs of the drive circuits, the logic circuits being switchable between first and second states to rotate a displayed orientation relative to the display panel;
   in the first state, the logic circuits configuring the first drive circuits to operate in their segment mode and the second drive circuits to operate in their common mode;
   in the second state, the logic circuits configuring the first drive circuits to operate in their common mode and the second drive circuits to operate in their segment mode;
   wherein the logic circuits change the signal connections between the control outputs of the display controller circuit and the control inputs of the drive circuits depending on whether the drive circuits are operating in common mode or segment mode.

2. A display system as recited in claim 1, further comprising a voltage source that provides a first set of voltages to drive circuits that are in their segment mode and a different set of voltages to drive circuits that are in their common mode.

3. A display system as recited in claim 2, wherein the voltage source comprises a plurality of programmable voltage divider circuits.

4. A display system as recited in claim 2, wherein the display panel is an LCD display panel that is driven by select and non-select voltages, the voltage source being programmable to provide said select and non-select voltages to the respective drive circuits in accordance with whether they are operating in their segment or common modes.

5. A method of rotating a displayed orientation relative to a display panel, the display panel having first and second sets of select lines, the method comprising:
   connecting the first set of select lines to be driven as segment lines, and connecting the second set of select lines to be driven as common lines; and
   in response to a rotation signal, connecting the first set of select lines to be driven as common lines, and connecting the second set of select lines to be driven as segment lines.

6. A method as recited in claim 5 further comprising a step of varying drive voltages to the first and second sets of select lines, respectively, in response to the rotation signal.

7. A portable computer device, comprising:
   a keyboard;
   a display screen upon which an image can be displayed in first and second orientations, wherein the keyboard is used with the image displayed in the first orientation;
   a hinge that pivotally connects the keyboard and display screen, allowing the keyboard to be folded in a back-to-back relationship with the display screen;
   an indicia on the display screen that upon activation by an operator changes between the first and second image orientations, wherein the second orientation is used primarily when the keyboard is folded in the back-to-back relationship with the display screen; and
   means for at least partially disabling the keyboard in response to activating the indicia to change to the second image orientation.

8. A portable computer device as recited in claim 7, wherein the means for disabling the keyboard comprises a data processor that monitors activation of the indicia by the operator.

9. A computer device comprising:
   a display support having opposing interior and exterior surfaces, wherein the interior surface supports a display screen;
   a keyboard support having opposing interior and exterior surfaces, wherein the interior surface supports a keyboard;
   a hinge mechanism that pivotally couples the display support to the keyboard support for enabling:
     closure of the device when the interior surfaces of the display support and the keyboard support are pushed together;
     use of the device as a typing device when opened with an angle up to 180 degrees between the interior surfaces of the display support and the keyboard support; and use of the device as a notepad device when opened with the exterior surface of the display support in contact with the exterior surface of the keyboard support;

an indicia on the display screen that upon activation by an operator changes between first and second image orientations relative to the display screen, wherein the first orientation is used primarily when the computer device is used as a typing device and the second orientation is used primarily when the computer device is used as a notepad device;

wherein activating the indicia to change to the second image orientation at least partially disables the keyboard.

10. A computer device as recited in claim 9, further comprising a data processor that monitors activation of the indicia by the operator and at least partially disables the keyboard in response to said activation of the indicia.

11. A method of disabling a keyboard in a computer device that can be used alternatively as a typing device and as a notepad device, with first and second display orientations, respectively, comprising;

positioning an indicia on a display screen of the computer device;

changing the display orientation between the first and second orientations in response to an operator activating the indicia; and at least partially disabling the keyboard when the operator has activated the indicia to change to the second display orientation.

12. A method as recited in claim 11, further comprising the following additional steps:

selecting the indicia to have an upright orientation; and orienting the indicia on the display screen for upright viewing at an angle between the first and second image orientations.

* * * * *